(12) United States Patent
Chen et al.

(10) Patent No.: US 12,500,903 B2
(45) Date of Patent: Dec. 16, 2025

(54) BENIGN NETWORK ENTITIES BASED MALICIOUS CAMPAIGN SIGNATURE GENERATION

(71) Applicant: Palo Alto Networks, Inc., Santa Clara, CA (US)

(72) Inventors: Zhanhao Chen, Santa Clara, CA (US); Chao Lei, Sunnyvale, CA (US); Chien-Hua Lu, San Jose, CA (US); Daiping Liu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 142 days.

(21) Appl. No.: 18/427,542

(22) Filed: Jan. 30, 2024

(65) Prior Publication Data
US 2025/0247403 A1   Jul. 31, 2025

(51) Int. Cl.
*H04L 9/40* (2022.01)
(52) U.S. Cl.
CPC ...... *H04L 63/1416* (2013.01); *H04L 63/1425* (2013.01); *H04L 63/0227* (2013.01)
(58) Field of Classification Search
CPC ............. H04L 63/1416; H04L 63/1425; H04L 63/0227
See application file for complete search history.

(56) References Cited

U.S. PATENT DOCUMENTS

2016/0226900 A1\* 8/2016 Fajardo Verano .... G06F 21/562
2022/0385678 A1\* 12/2022 Bobak ..................... H04L 41/22

\* cited by examiner

*Primary Examiner* — Brian Whipple
(74) *Attorney, Agent, or Firm* — Gilliam IP PLLC (57) ABSTRACT

A signature generator has been designed that can create a malicious campaign signature with substantial coverage of malicious campaign behavior without impeding benign traffic. The malicious campaign signature generator uses data of multiple, known malicious campaigns to identify abused, benign network entities. The signature generator builds a graph data structure for each malicious campaign that represents the abused network entities. The relationships encoded in the graph data structure indicate the use of the combination of abused network entities in the campaign. The signature generator aggregates the graph data structures and identifies a combination of the benign network entities that were highly abused across the multiple malicious campaigns with respect to all of the abused network entities represented in the graph data structures. A signature is then created from the identifiers of this combination of highly abused network entities.

20 Claims, 6 Drawing Sheets

BENIGN NETWORK ENTITIES BASED MALICIOUS CAMPAIGN SIGNATURE GENERATION

BACKGROUND

The disclosure generally relates to transmission of digital information for event detection such as signature detection (e.g., CPC subclass H04L 63/1416) and security arrangements for protecting computers, components thereof, programs or data against unauthorised activity (e.g., CPC subclass G06F 21/00).

A malicious campaign is a series of incidents or activities by a threat actor to fulfill a malicious purpose. For instance, a malware campaign has a purpose of distributing malware. A threat actor can be an individual or an organization. While at least one of the activities of a malicious campaign is malicious, some of the campaign activities may appear benign. For example, each of using an online service to determine an Internet Protocol (IP) address and downloading program code from a public code repository is a benign activity.

Countermeasures to malicious campaigns employ detection mechanisms that search network traffic for particular network entities by uniform resource locators (URLs). URL filtering can block URLs known to be suspicious or compromised. Another detection mechanism clusters domain names, uses known malicious domains as seed domains, and then identifies which clusters include the seed domains.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

The description uses the term "benign network entity" to refer to an entity that can be contacted via a network and that is either known to be benign or is not identified as malicious. A network entity has an identifier that allows contacting the entity. Examples of an identifier of a network entity include a domain name, hostname, and a network address, such an Internet Protocol (IP) address.

The description uses the term "abused" to refer to use of a benign network entity in a malicious campaign. The use itself is not necessarily malicious, but the use can be one task or incident of a malicious campaign. When the description refers to an "abused network entity," it is implied that the network entity is benign. Extent of abuse can be quantified based on recurring use across malicious campaigns, and perhaps within a malicious campaign.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Use by a malicious campaign of a combination of benign network entities can inform detection of a malicious campaign being carried out. A signature generator has been designed that can create a malicious campaign signature with substantial coverage of malicious campaign behavior without impeding benign traffic. The malicious campaign signature generator uses data of multiple known malicious campaigns to identify benign network entities (e.g., domains, sites, hosts, etc.) used in each malicious campaign ("abused network entities"). The signature generator builds a graph data structure for each malicious campaign that represents the abused network entities. The relationships encoded in the graph data structure indicate the use of the combination of abused network entities in the campaign. The signature generator aggregates the graph data structures and identifies a combination of the benign network entities that were highly abused across the multiple malicious campaigns with respect to all of the abused network entities represented in the graph data structures. A signature is then created from the identifiers of this combination of highly abused network entities. The signature can be deployed to scan network traffic and detect network traffic corresponding to a malicious campaign.

Example Illustrations

Figure 1:
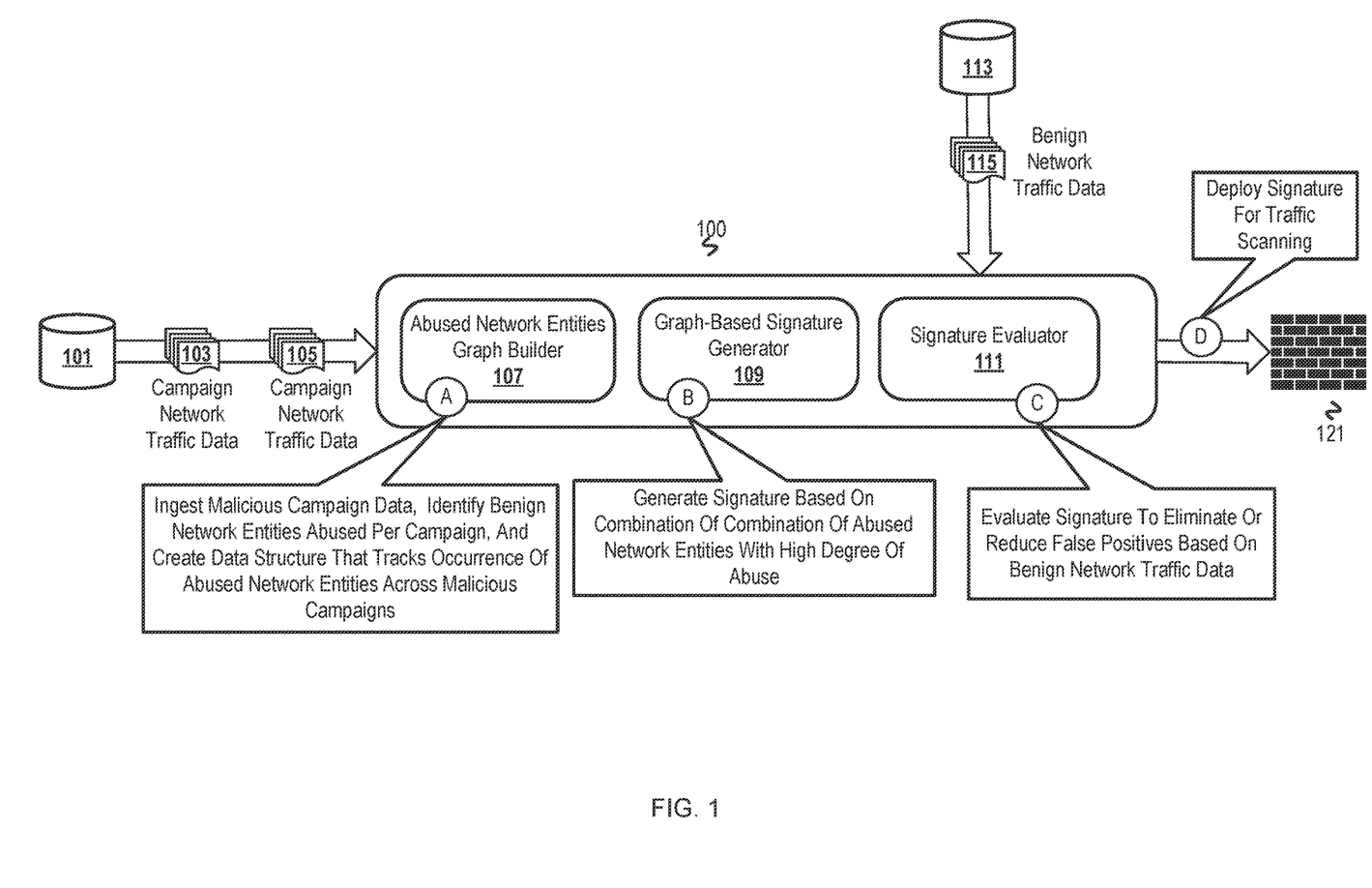
FIG. 1 is a conceptual diagram of a system generating and deploying a signature to detect a malicious campaign based on a combination of benign network entities occurring in network traffic data.

FIG. 1 is a conceptual diagram of a system generating and deploying a signature to detect a malicious campaign based on a combination of benign network entities occurring in network traffic data. A malicious campaign signature generator 100 is depicted as including an abused network entities graph builder 107, a graph-based signature generator 109, and a signature evaluator 111. The malicious campaign signature generator 100 is depicted as being in communication with a firewall 121, which can be a hardware firewall or software firewall. The malicious campaign signature generator 100 could be communicatively coupled with multiple firewalls and can be implemented as a component of a firewall.

FIG. 1 is annotated with a series of letters A-D each of which represents one or more operations. Although these stages are ordered for this example, the stages illustrate one example to aid in understanding this disclosure and should not be used to limit the claims in this or any other figure that uses stage labels. Subject matter falling within the scope of the claims can vary from what is illustrated.

At stage A, the malicious campaign signature generator 100 ingests data of multiple malicious campaigns. FIG. 1 depicts as examples campaign network traffic data 103 and campaign network traffic data 105, but the malicious campaign data can also include natural language descriptions (e.g., reports, blogs, etc.) about a malicious campaign. With the ingested data, the abused network entities graph builder 107 ("graph builder") identifies, per malicious campaign, network entities that are benign and that were abused in the malicious campaign. The graph builder 107 also creates a data structure that tracks occurrence of abused network entities across malicious campaigns. The occurrence or recurrence of abused network entities corresponds to extent of abuse.

At stage B, the graph-based signature generator 109 generates a signature for malicious campaign detection. The graph-based signature generator 109 uses the data structure(s) of the graph builder 107 to identify a combination of abused network entities with a high degree of abuse across the malicious campaigns. The signature is the collection of identifiers of each abused network entity in the combination.

At stage C, the signature evaluator 111 evaluates the generated signature for quality assurance to avoid a deployed signature impeding legitimate traffic. The signature evaluator 111 obtains benign network traffic data 115 from a repository 113. The signature evaluator 111 applies the generated signature to the benign network traffic data 115. If a match is found for the signature, then the signature evaluator 111 discards the signature or marks the signature to prevent deployment to avoid false positives.

At stage D, the malicious campaign signature generator 100 deploys the generated signature for traffic scanning. It is presumed that the signature evaluator 111 did not find a match for the signature in the benign network traffic data 115. Accordingly, the malicious campaign signature generator 100 deploys the signature to one or more firewalls including the firewall 121.

Figure 2:
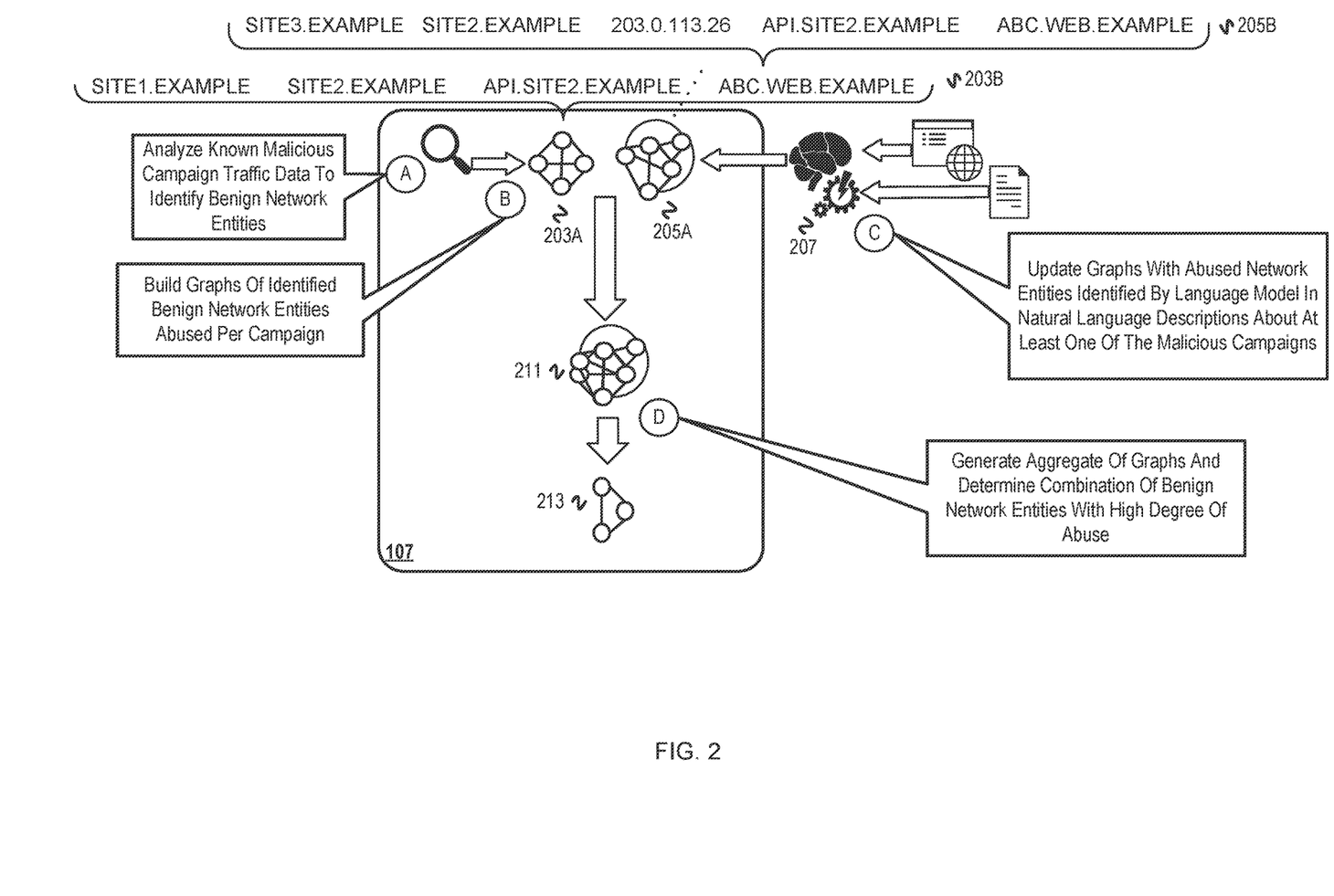
FIG. 2 is a diagram of the graph builder 107 building and using graphs of abused across multiple malicious campaigns for malicious campaign signature generation.

FIG. 2 is a diagram of the graph builder 107 building and using graphs of abused across multiple malicious campaigns for malicious campaign signature generation. FIG. 2 depicts simple examples of benign network entities abused in two malicious campaigns. One campaign abused a combination 203B of benign network entities including SITE1.EXAMPLE, SITE2.EXAMPLE, API.SITE2.EXAMPLE, and ABC.WEB.EXAMPLE. Another malicious campaign abused a combination 20B of benign network entities including SITE3.EXAMPLE, SITE2.EXAMPLE, 203.0.113.26, API.SITE2.EXAMPLE, and ABC.WEB.EXAMPLE. The names chosen for these example benign network entities are arbitrary.

Similar to FIG. 1, FIG. 2 is annotated with a series of letters A-D, each of which represents one or more operations. The depiction can be considered example details of stage B in FIG. 1.

At a stage A, the graph builder 107 analyzes network traffic data known to be for malicious campaigns. The graph builder 107 analyzes the network traffic data to identify benign network entities that were abused by the malicious campaigns.

At stage B, the graph builder 107 builds graphs of abused network entities per malicious campaign. In this illustration, the graph builder 107 builds a graph 203A based on the abused network entities 203B and builds a graph 205A based on the abused network entities 205B. The graph builder 107 creates a node to represent each benign network entity used in a malicious campaign and connects the nodes abused in a malicious campaign. Thus, each of the graphs 203A, 205A is a fully connected graph. If abuse of a network entity recurs within a malicious campaign, the graph builder 107 may quantify recurrence with a factor or weight associated with the node. FIG. 2 depicts the graph 203A as a fully connected graph with nodes representing the abused entities 203B and the graph 205A as a fully connected graph representing the abused network entities 205B.

At stage C, the graph builder 107 updates graphs with abused network entities identified by a language model 207. One or more natural language descriptions of at least one of the malicious campaigns from one or more data sources can be submitted to the natural language model with a prompt or query to identify network entities and/or benign network entities.

At stage D, the graph builder 107 generates an aggregate 211 of the graphs 203A, 205A and identifies a combination of highly abused network entities. The graph builder 107 aggregates the graphs 203A, 205A to determine extent of abuse of the benign network entities across the malicious campaigns. For the aggregation, the graph builder 107 quantifies recurrence of network entities across the graphs 203A, 205A and uses the quantified value to represent degree of abuse. The quantified abuse level can be assigned to edges between pairs of nodes. For instance, the aggregate graph 211 includes nodes that represent network entities SITE2.EXAMPLE, API.SITE2.EXAMPLE, and ABC.WEB.EXAMPLE. The edge connecting the nodes representing SITE2.EXAMPLE and ABC.WEB.EXAMPLE could be assigned "2" to quantify abuse of both represented network entities in 2 malicious campaigns evidence by occurrence in both graphs 203A, 205A. With the aggregate graph 211, the graph builder 107 (or a process that receives the graph 211) can analyze the graph 211 to determine a combination of abused network entities with a high degree of abuse. This combination can be represented as a subgraph 213 representing the combination of abused network entities with a high degree of abuse across malicious campaigns, assuming all combinations did not recur across all malicious campaigns.

Figure 3:
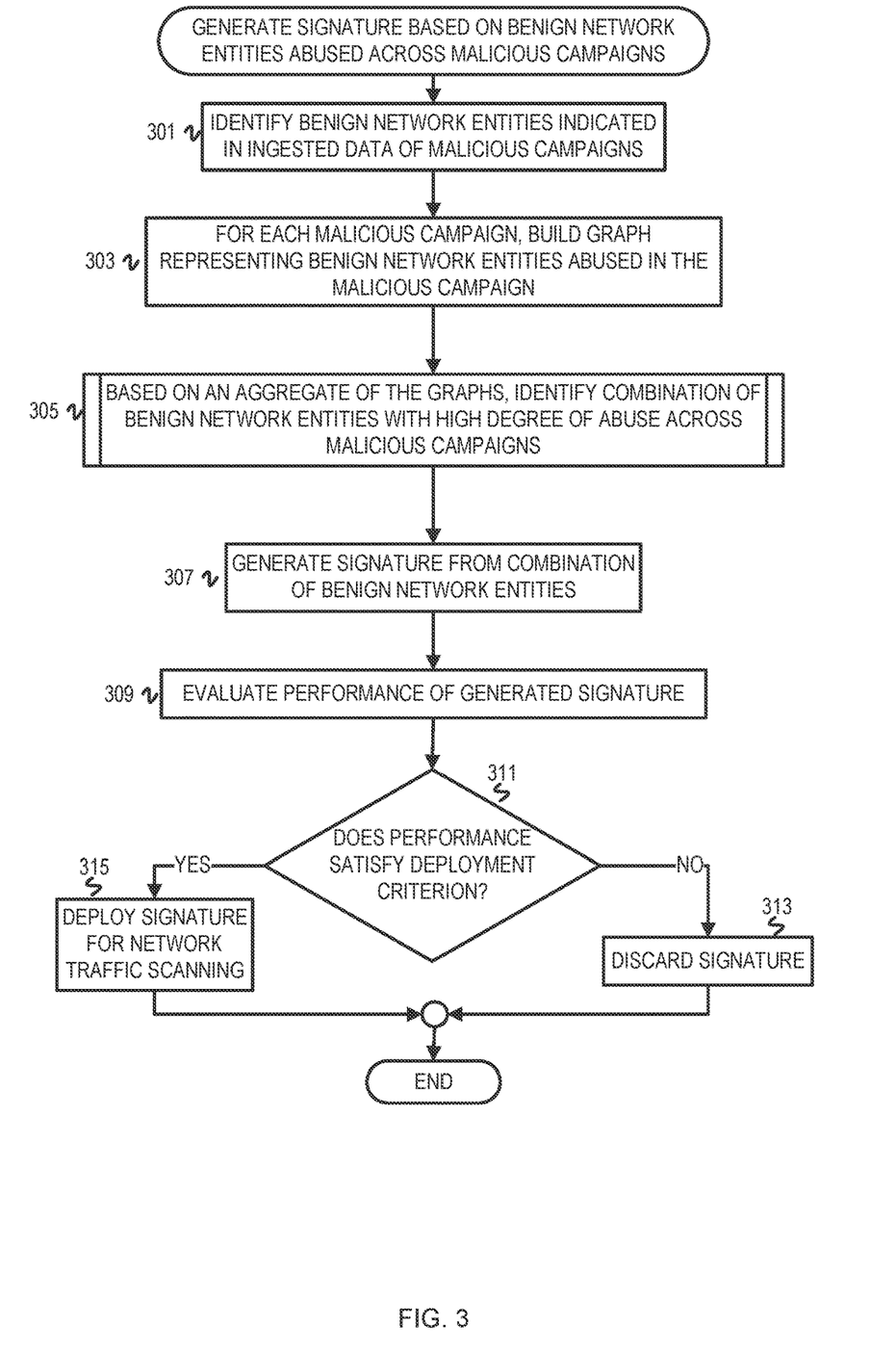
FIG. 3 is a flowchart of example operations for generating a signature based on benign network entities abused across malicious campaigns.
Figure 4:
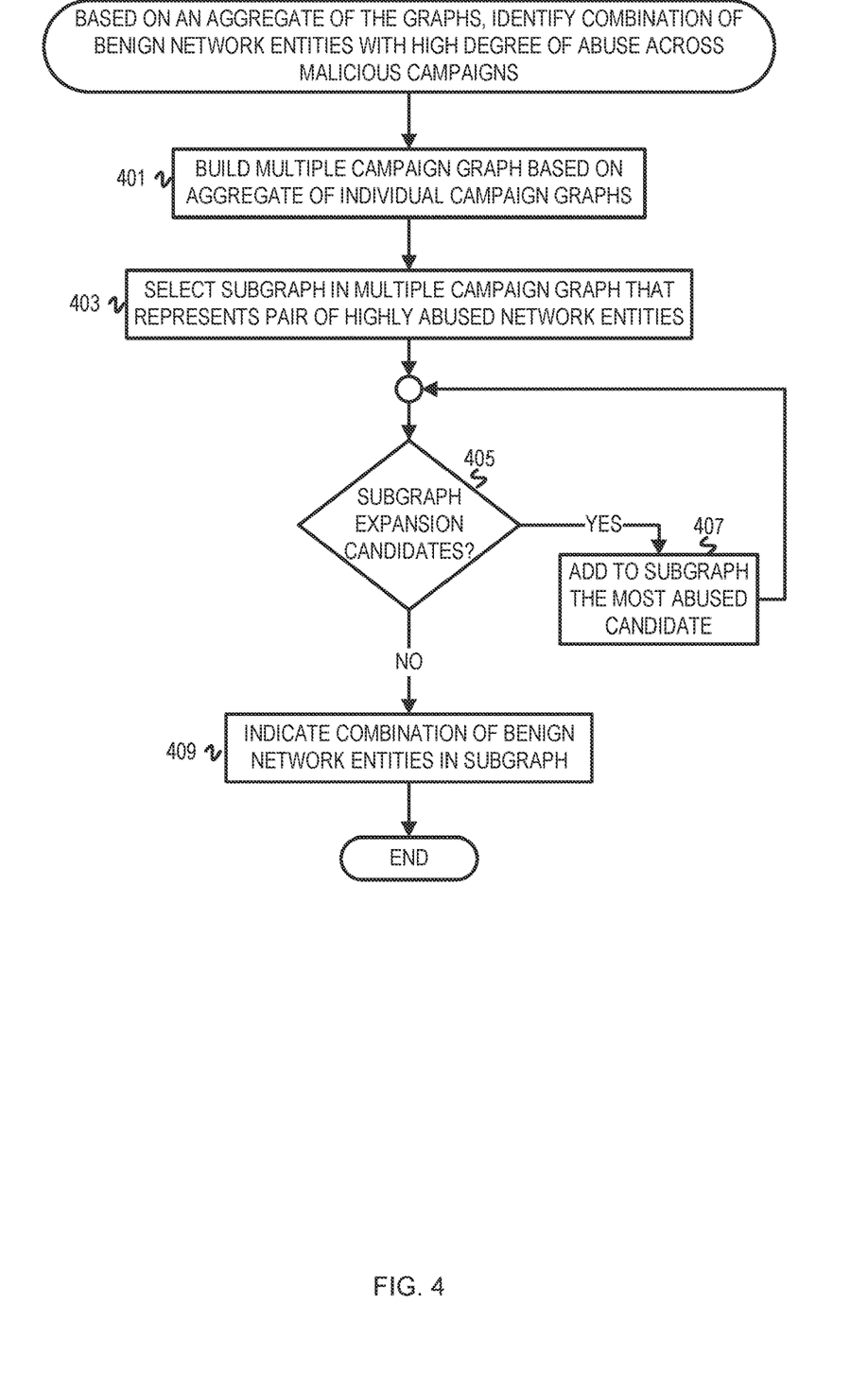
FIG. 4 is a flowchart of example operations for identifying a combination of benign network entities with a high degree of abuse across malicious campaigns based, at least in part, on aggregation of the individual campaign graphs.
Figure 5:
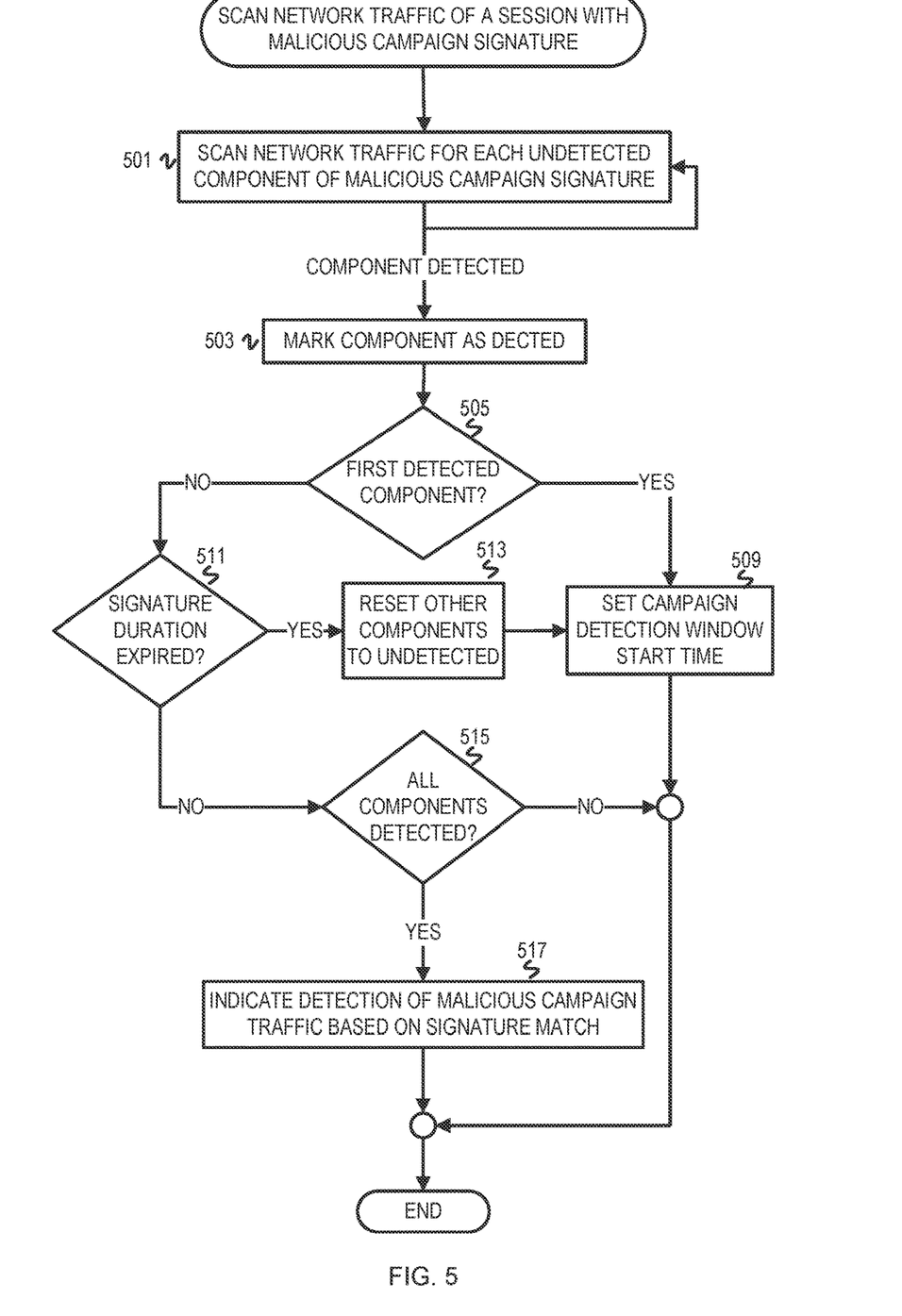
FIG. 5 is a flowchart of example operations for scanning network traffic of a session with a malicious campaign signature.

While the diagrams provide an explanation of the malicious campaign generator technology with reference to examples, flowcharts are provided to provide some elaboration with reference to example operations. FIGS. 3 and 4 correspond to generation of a malicious campaign signature. FIG. 5 corresponds to deployment of a malicious campaign signature. The example operations of FIGS. 3 and 4 refer to a signature generator for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. The example operations of FIG. 5 refer to a security appliance.

FIG. 3 is a flowchart of example operations for generating a signature based on benign network entities abused across malicious campaigns. The example operations presume one or more data sources are specified that include network traffic data for multiple malicious campaigns. Examples of the data include traffic logs, security reports, and domain name system (DNS) request logs.

At block 301, a signature generator identifies benign network entities indicated in ingested data of malicious campaigns. Identifying the benign network entities will vary depending upon the data being ingested. For example, the signature generator can parse DNS records to identify network entities based on known structure of a DNS request. The signature generator can then disregard those network entities indicated in a known threat actor list and/or store those with identifiers in a permitted list. As additional examples, the signature generator can parse web-based application programming interface (API) calls. In addition, the signature generator can prompt a language model to identify network entities in an accessible natural language description (e.g., report, website, data feed, etc.) about a malicious campaign or other natural language description of a malicious campaign. To correlate network traffic data and natural language descriptions, an identifier or name of the malicious campaigns can be used. The malicious campaigns are differentiated by source identifier. The source identifiers will have been determined from malware analysis reports. For instance, a signature of a source (e.g., software instance or physical/virtual device) of a malicious campaign can be determined from malware analysis reports. When scanning live or "real-world" traffic, the malicious campaign traffic is delineated by the source identifier (e.g., by matching a signature of the source). Benign network entities associated with a same malicious campaign source identifier are grouped together as benign network entities abused in a same malicious campaign. The signature generator organizes identifiers of the benign network entities by malicious campaign. In addition, the signature generator can correlate different types of identifiers for a same network entity.

At block 303, the signature generator builds a graph for each of the malicious campaigns. The signature generator builds each graph to represent the benign network entities abused in the respective malicious campaign. For instance, the signature generator creates a node for each benign network entity that has been identified as abused in the malicious campaign. As each node is added to the graph, the node is connected to all other nodes present in the graph. Connecting the nodes representing the abused network entities relates the nodes to correspond to the represented network entities being used in a same malicious campaign.

At block 305, the signature generator identifies a combination of abused network entities with a high degree of abuse across malicious campaigns. The signature generator uses an aggregate of the information in the individual campaign graphs to determine recurrence of combination of benign network entities across malicious campaigns. FIG. 4 provides more detailed example operations.

At block 307, the signature generator generates a signature from the determined combination of highly abused network entities. The signature generator can traverse a data structure that indicates the combination of highly abused network entities and extract the identifier(s) as each entity is traversed. The signature generator can generate the signature to organize the identifiers by identifier type (e.g., URL, IP address, etc.). The signature generator can compress the signature. For instance, the signature generator can create a hash of each identifier. The data structure for the signature does not impose an order or sequence constraint. While implementations could impose order on the identifiers for a sequence specific signature, this might substantially decrease coverage. The data structure created to be the signature also indicates a signature duration or time window. This duration defines a span of traffic in which the signature is to be matched to be considered detection of a malicious campaign. The signature duration is related to the analysis time of the source data used in determining the malicious campaign signature. Implementations can set the signature duration differently, such as the longest of the malicious campaigns used in creating the individual campaign graphs or an average duration of the malicious campaigns. As an example, the duration for a malicious campaign signature would be set to 5 minutes if the analysis of malware reports to determine the benign network entities for a malicious campaign was 5 minutes.

At block 309, the signature generator evaluates performance of the generated signature. Evaluating performance of the signature involves determining likelihood of false positives. As an example, the signature generator scans network traffic known to be benign with the signature. A threshold can be defined for acceptable performance, for example 1%. If at least 1% of sessions in evaluation network traffic matches the signature, then the performance is not acceptable and the signature is not deployed. Implementations can impose a higher requirement that a generated signature not match any session in evaluation traffic in order to be deployed. The signature can also be evaluated against live traffic. Performance would be determined based on detection of other techniques.

At block 311, the signature generator determines whether the signature satisfies a defined performance criterion. As indicated above, the performance criterion can be that the signature does not match beyond a defined limit. If the signature satisfies the performance criterion, then operational flow proceeds to block 315. Otherwise, operational flow proceeds to block 313.

At block 313, the generated signature is discarded. Implementations can mark the signature to prevent deployment and use the signature for analysis and/or comparison against other signatures.

At block 315, the signature generator deploys the generated signature for network traffic scanning. For example, the signature generator installs or communicates the signature to security appliance or a security appliance manager.

FIG. 4 is a flowchart of example operations for identifying a combination of benign network entities with a high degree of abuse across malicious campaigns based, at least in part, on aggregation of the individual campaign graphs. The example operations of FIG. 4 commence after the individual campaign graphs have been built. However, implementations can aggregate data as each additional individual campaign graph is built.

At block 401, the signature generator builds a multiple campaign graph based on an aggregate of the individual campaign graphs. For example, the signature generator selects a pair of graphs and merges the selected pair of graphs according to a merging/stitching algorithm. The signature generator continues merging until all individual campaign graphs have been merged into the multiple campaign graph. For example, the signature generator merges individual campaign graph G into multiple campaign graph H by selecting each edge e in G and adding e along with the connected nodes to H if e is not already present in H. If e is already present in H, then the weight of e is adjusted (e.g., increased) to represent recurrence. If one of the connected nodes is already present in H, then a weight of that node can be adjusted. When building the multiple campaign graph, recurrence of a pair of nodes in multiple graphs is encoded in a weight or value assigned to a connecting edge. For instance, an edge connecting a pair of nodes occurring in three of the individual campaign graphs will have an edge weight of 3. Factors or modifiers can also be applied to edge weights. As an example, a modifier representing frequency of occurrence within each campaign can be applied to increase the value assigned to an edge.

At block 403, the signature generator selects a subgraph in the multiple campaign graph that represents a pair of highly abused network entities. The signature generator can search the multiple campaign graph for an edge with a highest weight representing abuse. This is a starting point for the signature generator to determine a combination of abused network entities with high recurrence across the malicious campaigns which likely corresponds to larger coverage of malicious campaign behavior and lower likelihood of occurrence in non-malicious traffic. The example operations presume a greedy expansion type of graph expansion which strives to efficiently find a combination.

At block 405, the signature generator determines whether there are subgraph expansion candidates. Expansions candidates are limited to those nodes in the multiple campaign graph that are fully connected with the current subgraph. These would be fully connected neighboring nodes of the subgraph. Full connection indicates that the connected nodes represent benign network entities used in all of the malicious campaigns represented in the multiple campaign graph. If there is at least one subgraph expansion candidate, then operational flow proceeds to block 407. Otherwise, operational flow proceeds to block 409.

At block 407, the signature generator adds to the subgraph the most abused candidate. Determining the most abused candidate uses the values representing recurrence associated or assigned to the edges. As one example, the signature generator adds the weights of the edges connecting to the candidate to the subgraph. The signature generator then selects the candidate connected to the subgraph with the edges having the greatest sum of abuse weights. After block 407, operational flow returns to block 405 to determine whether there is any candidate node with respect to the expanded subgraph.

At block 409, the signature generator indicates a combination of benign network entities in the subgraph. When the subgraph can no longer be expanded, the signature generator extracts identifiers of the abused network entities represented therein and populates a data structure with the abused network entities identifiers. Extraction can vary based on implementation of how a benign network entity is identified. If a benign network identifier is a tuple (e.g., {hostname, IP address, URL}), then the tuple would be extracted as the benign network entity identifier. If a benign network entity identifier could be a hostname, IP address, or URL, then extraction may treat them as different identifiers or may aggregate them into a tuple as a single identifier. If an implementation processes different types of identifiers as separate identifiers, then the implementation will have built the graph with a different node for each identifier. The data structure is used for the signature generation.

FIG. 5 is a flowchart of example operations for scanning network traffic of a session with a malicious campaign signature. It is presumed that the malicious campaign signature has been deployed after evaluation and satisfied the evaluation criterion or criteria. A firewall or security appliance managing multiple sessions scans each session with one or more deployed malicious campaign signatures. The example operations of FIG. 5 describe operations for a single malicious campaign signature for ease of understanding.

At block 501, a security appliance scans network traffic for each undetected component of a malicious campaign signature. A signature component corresponds to a network entity represented in the signature. The signature component may be a tuple of identifier or a single identifier depending upon signature generation. As an example of scanning for a component, the security appliance scans the network traffic of a session for an identifier of a network entity. The security appliance specified fields of session traffic, such as IP addresses in IP destination fields or a URL in a request header field of a Hypertext Transfer Protocol (HTTP) message. When a network entity identifier is detected, the security appliance filters for benign network entity identifiers. If the component uses compact identifiers (e.g., hash values), then the security appliance uses the same algorithm to generate a compact representation of the detected network entity identifier. If at least one of the components has different identifier types, then the security appliance compares against the components of a same type as the detected network identifier. The scanning is ongoing as represented by an arrow returning to block 501.

At block 503, the security appliance has detected a signature component in the session network traffic and marks the component as detected. The malicious campaign signature is represented with a data structure indicating the abused network entity identifiers, a detection field for each abused network entity indicated in the signature, a campaign detection start time, and a time window or duration for the signature. The security appliance updates the detection field for the component that has been detected. Implementations can use different data structure for the signature and for a deployed signature. For instance, the deployed signature data structure can include detection fields and a campaign detection start time while the signature data structure does not.

At block 505, the security appliance determines whether the detected component is the first of the signature components detected in the current signature time window. For this determination, the security appliance scans the detection fields to determine whether any other signature component has already been detected. If the detected component is the first, then operational flow proceeds to block 509. Otherwise, operational flow proceeds to block 511.

At block 509, the security appliance sets a campaign detection window start time based on when the first detected component was detected. The signature duration and the campaign detection window start time together are used to bound occurrence of the combination of benign network entities represented by the signature to a duration corresponding to the malicious campaigns that were the basis for the signature.

At block 511, the security appliance has determined that the detected component is not the first detected and now determines whether the signature duration has expired. The security appliance will determine whether interval between the campaign detection window start time and time of detecting the current component exceeds the signature duration. If the signature duration has expired, then operational flow proceeds to block 513. If the signature duration has not expired, then operational flow proceeds to block 515.

At block 513, the security appliance has determined that the signature duration has expired and resets the other components to undetected. Thus, the currently detected component is treated as the first detected of the components. The security appliance sets the detection fields of the other components to indicate not detected. Operational flow proceeds from block 513 to block 509 for the campaign detection window start time to be set to the time of detection of the currently detected component.

At block 515, the security appliance determines whether all signature components have been detected. The security appliance reads the detection fields of the components to determine whether all signature components have been detected. If all signature components have been detected, then operational flow proceeds to block 517. If not, then operational flow ends while the scanning continues.

At block 517, the security appliance indicates detection of malicious campaign traffic based on the signature match. The security appliance can perform a security action identifying the session and/or source of the session. A security action can be any one or more of generating a notification, blocking traffic of the session, buffering traffic of the session, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations for signature evaluation can be deferred until it is determined whether multiple different signatures can be generated for the same set of malicious campaigns. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
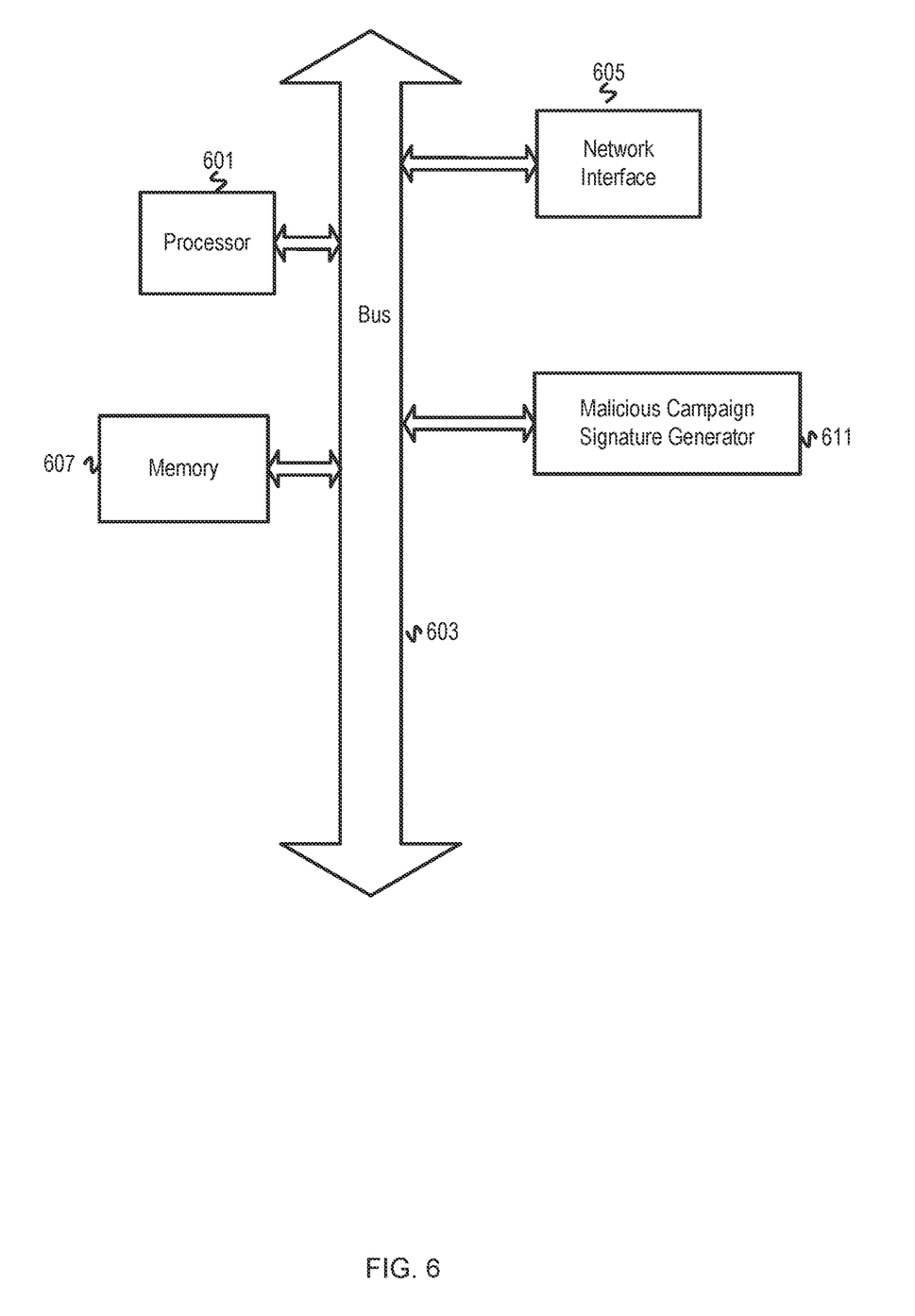
FIG. 6 depicts an example computer system with a malicious campaign signature generator.

FIG. 6 depicts an example computer system with a malicious campaign signature generator. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a malicious campaign signature generator 611. The malicious campaign signature generator 611 determines a combination of benign network entities that are highly abused across multiple malicious campaigns and generates a signature based on the identified combination. To identify the highly or most abused combination of benign network entities across malicious campaigns, the malicious campaign signature generator 611 employs graph data structures to represent the abused network entities related by malicious campaign and then aggregates the graph data structures. The aggregated information allows the malicious campaign signature generator 611 to determine a combination of benign network entities with a high degree of abuse across the malicious campaigns. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising:
    identifying benign network entities used in a plurality of malicious campaigns based, at least in part, on network traffic data already determined to be associated with the plurality of malicious campaigns;
    for each of the plurality of malicious campaigns, building an individual campaign graph representing those of the benign network entities used in the malicious campaign;
    aggregating the individual campaign graphs into a multiple campaign graph;

selecting a pair of nodes in the multiple campaign graph representing a most used pair of benign network entities, wherein the selected pair of nodes and the edge connecting them form a subgraph;

determining a set of fully connected nodes in the multiple campaign graph that represents the most used benign network entities across the plurality of malicious campaigns, wherein determining the set of fully connected nodes starts with the subgraph; and generating a signature based on identifiers of the benign network entities represented in the set of fully connected nodes.

2. The method of claim 1, wherein determining the set of fully connected nodes comprises expanding the subgraph until candidates are exhausted, wherein expanding the subgraph comprises repeatedly identifying nodes fully connected to the subgraph as candidates and adding to the subgraph the one of the candidates most used across the plurality of campaigns.

3. The method of claim 1, wherein identifying benign network entities used in at least a first of the plurality of malicious campaigns comprises identifying at least some of the benign network entities with a language model based on natural language descriptions of the first malicious campaign.

4. The method of claim 1, wherein building an individual campaign graph for each of the plurality of malicious campaigns comprises determining which of the benign network entities were contacted by a source of the malicious campaign and connecting those of the nodes representing those of the benign network entities contacted by the source.

5. The method of claim 1, wherein each individual campaign graph built for a corresponding one of the plurality of malicious campaigns represents those of the benign network entities contacted by a source of the malicious campaign during the malicious campaign.

6. The method of claim 1, wherein aggregating the individual campaign graphs into the multiple campaign graph comprises determining a weight of an edge in the multiple campaign graph based on recurrence of the nodes connected by the edge across the individual campaign graphs, wherein an edge weight represents extent of use by the plurality of malicious campaigns of the benign network entities represented by the connected nodes.

7. The method of claim 1, further comprising evaluating the generated signature against known benign network traffic and discarding the signature if a match for the signature is detected in the known benign network traffic.

8. The method of claim 1, wherein the identifiers of the benign network entities comprise at least one of network addresses and uniform resource locators.

9. The method of claim 1 further comprising scanning network traffic with the signature and, based on detecting the signature in a first session of the network traffic, indicating a source of the first session as a threat actor and/or the network traffic of the first session as malicious traffic.

10. A non-transitory, machine-readable medium having program code stored thereon, the program code comprising instructions to:

identify a plurality of benign network entities abused in a plurality of malicious campaigns based, at least in part, on network traffic known to be associated with the plurality of malicious campaigns;

for each of the plurality of malicious campaigns, build a graph data structure representing those of the benign network entities abused in the malicious campaign;

generate an aggregate graph data structure with abuse occurrence across the plurality of malicious campaigns quantified and associated with edges of the aggregate graph data structure, wherein the aggregate graph data structure is generated based on the graph data structures built for the plurality of malicious campaigns;

determine a subgraph in the aggregate graph data structure representing a most abused pair of the benign network entities;

expand the subgraph with fully connected neighboring nodes based on the abuse occurrences associated with edges; and generate a signature based on identifiers of the benign network entities represented in the expanded subgraph.

11. The non-transitory machine-readable medium of claim 10, wherein the instructions to expand the subgraph comprise instructions to determine fully connected neighboring nodes of the subgraph as candidates and add to the subgraph the one of the candidates with a greatest abuse occurrence while there are fully connected neighboring nodes of the subgraph.

12. The non-transitory machine-readable medium of claim 10, wherein the instructions to identify a plurality of benign network entities abused in a plurality of malicious campaigns comprise instructions to submit one or more natural language descriptions of at least one of the plurality of malicious campaigns to a language model to obtain identifiers of benign network entities used in the at least one of the malicious campaigns.

13. The non-transitory machine-readable medium of claim 10, wherein the instructions to generate the aggregate graph data structure comprise instructions to:

for each connected pair of nodes recurring across the graph data structures, determine a value that quantifies abuse occurrence based on the recurrence and assign the value to an edge in the aggregate graph data structure that connects the pair of nodes.

14. The non-transitory machine-readable medium of claim 10, wherein the instructions to identify the plurality of benign network entities comprise instructions to disregard any network entity known as a compromised or malicious network entity and to determine at least one of a network address and a uniform resource locator as an identifier of a benign network entity.

15. The non-transitory machine-readable medium of claim 10, wherein the program code further comprises instructions to scan benign network traffic with the signature and to deploy the signature, based at least in part, on not detecting match with the signature.

16. An apparatus comprising:

a processor; and a machine-readable medium having stored thereon instructions executable by the processor to cause the apparatus to, identify a plurality of benign network entities abused in a plurality of malicious campaigns based, at least in part, on network traffic known to be associated with the plurality of malicious campaigns;

for each of the plurality of malicious campaigns, build a graph data structure representing those of the benign network entities abused in the malicious campaign;

generate an aggregate graph data structure with abuse occurrence across the plurality of malicious campaigns quantified and associated with edges of the aggregate graph data structure, wherein the aggregate graph data structure is generated based on the graph data structures built for the plurality of malicious campaigns;

determine a subgraph in the aggregate graph data structure representing a most abused pair of the benign network entities;

expand the subgraph with fully connected neighboring nodes based on the abuse occurrences associated with edges; and generate a signature based on identifiers of the benign network entities represented in the expanded subgraph.

17. The apparatus of claim 16, wherein the instructions to expand the subgraph comprise instructions executable by the processor to cause the apparatus to determine fully connected neighboring nodes of the subgraph as candidates and add to the subgraph the one of the candidates with a greatest abuse occurrence while there are fully connected neighboring nodes of the subgraph.

18. The apparatus of claim 16, wherein the instructions to identify a plurality of benign network entities abused in a plurality of malicious campaigns comprise instructions executable by the processor to cause the apparatus to submit one or more natural language descriptions of at least one of the plurality of malicious campaigns to a language model to obtain identifiers of benign network entities used in the at least one of the malicious campaigns.

19. The apparatus of claim 16, wherein the instructions to generate the aggregate graph data structure comprise instructions executable by the processor to cause the apparatus to:

for each connected pair of nodes recurring across the graph data structures, determine a value that quantifies abuse occurrence based on the recurrence and assign the value to an edge in the aggregate graph data structure that connects the pair of nodes.

20. The apparatus of claim 16, wherein the instructions to identify the plurality of benign network entities comprise instructions executable by the processor to cause the apparatus to disregard any network entity known as a compromised or malicious network entity and to determine at least one of a network address and a uniform resource locator as an identifier of a benign network entity.

* * * * *